UNITED STATES PATENT OFFICE.

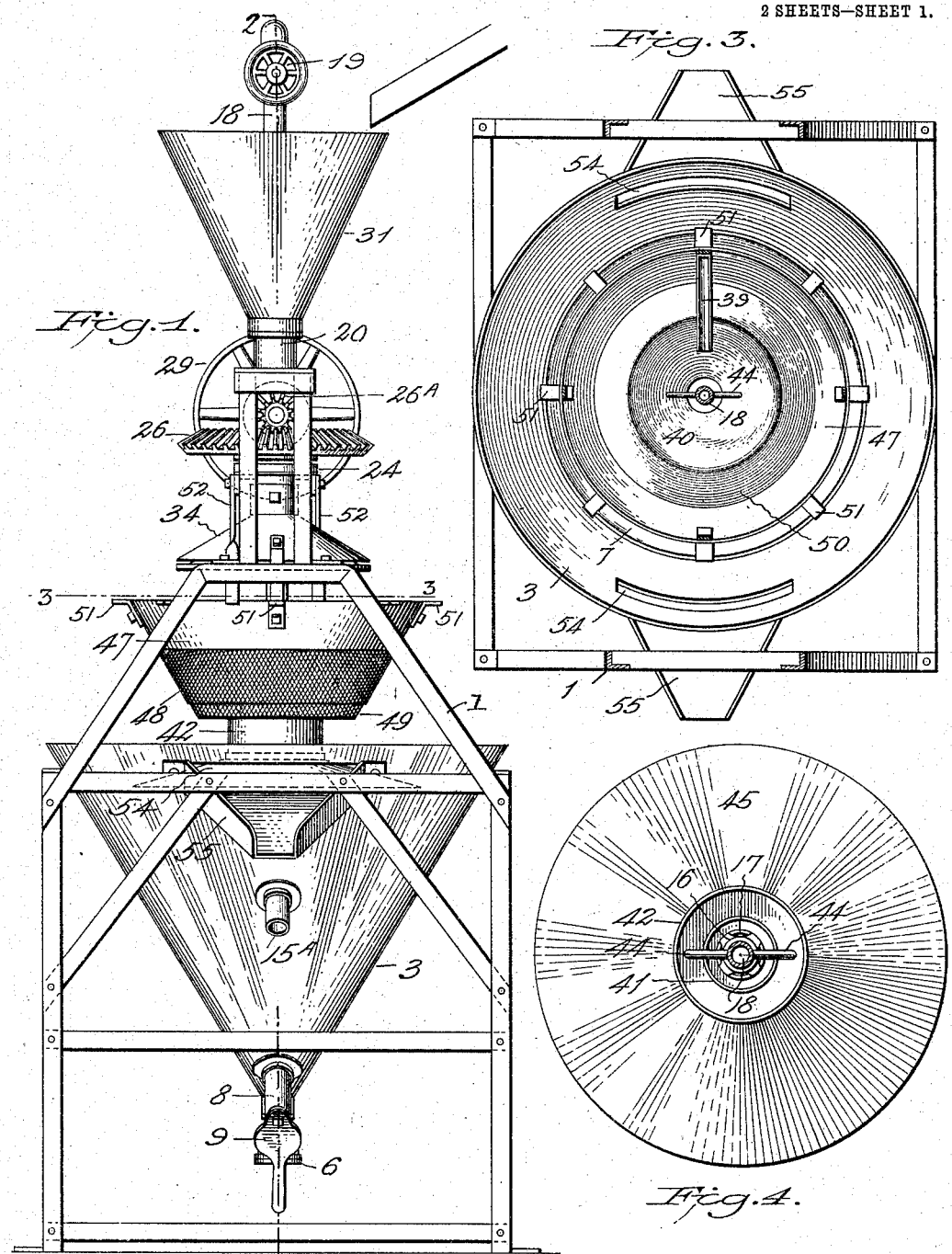

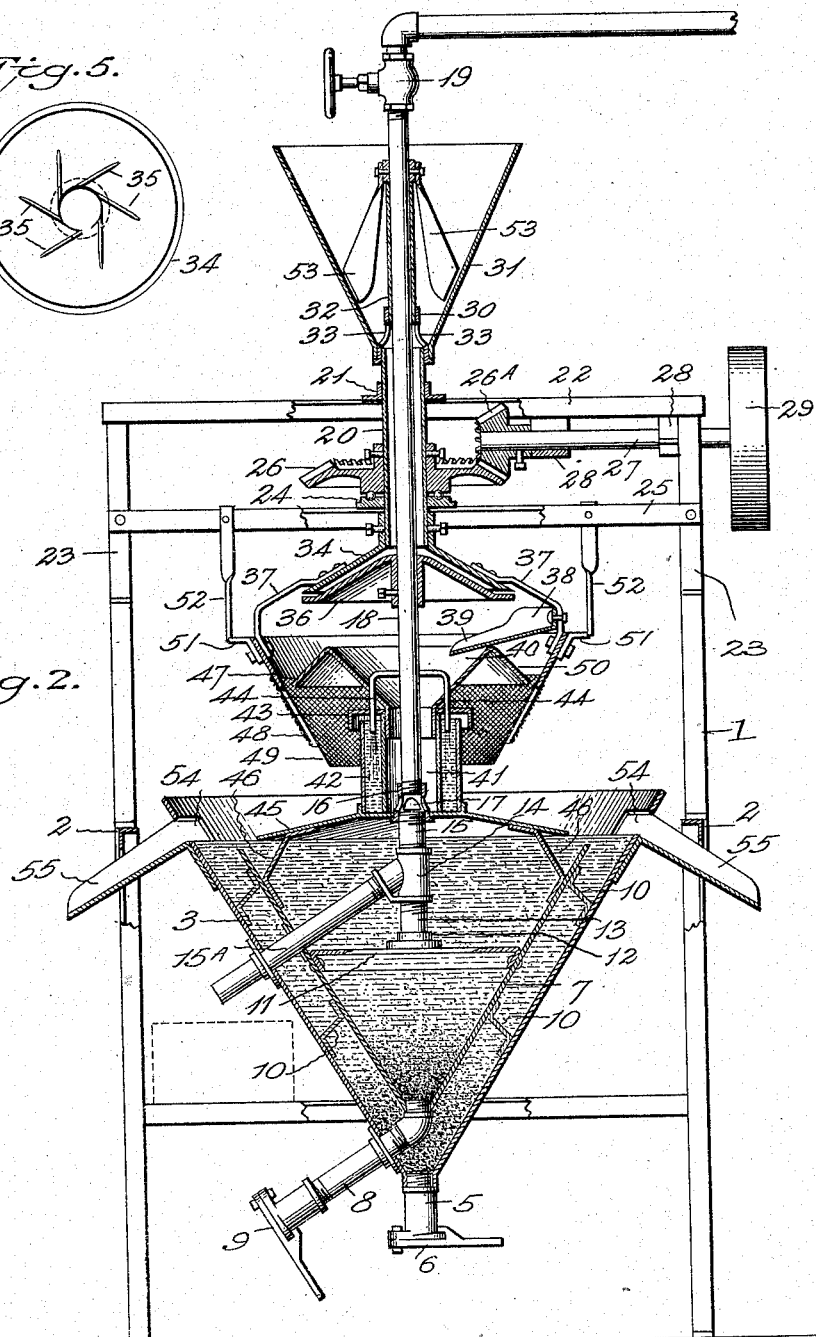

HOWARD G. KING, OF DENVER, COLORADO.

COMBINED ORE FEEDER, SAMPLER, CLASSIFIER, AND SEPARATOR.

946,759.     Specification of Letters Patent.     Patented Jan. 18, 1910.

Application filed December 28, 1908. Serial No. 469,630.

*To all whom it may concern:*

Be it known that I, HOWARD G. KING, a citizen of the United States of America, residing in the city and county of Denver and State of Colorado, have invented a new and useful Combined Ore Feeder, Sampler, Classifier, and Separator, of which the following is a specification.

My invention relates to improvements in ore dressing machinery, and the objects of my invention are: First, to provide a combined ore feeding and sampling, classifying and mineral saving machine. Second, to provide a crushed ore feeder, classifier, and separator, that is especially adapted to separate the finely pulverized and powdered element of ores, that form a floating slime product when mixed with or fed into a body of water or into a chemical solution, such as a cyanid solution, from the coarser particles of crushed ores. And third, to provide a simple and inexpensive machine that will separate the dry slime products of ores from the top of the surface of a body of flowing water, and that will classify and separate the coarse mineral particles of crushed ores from the gangue products of ores. I attain these objects by the mechanism illustrated in the accompanying drawings, in which:

Figure 1, is an end view of the machine. Fig. 2, is a vertical sectional view thereof, on the line 2—2 of Fig. 1. Fig. 3, is a sectional plan view, on the line 3—3 of Fig. 1. Fig. 4, is an enlarged, detail plan view of the water distributing disk, the water reservoir, sample chamber, and pipes connecting the main water supply pipe with the said reservoir. And Fig. 5, is a bottom plan view of the ore feeding disk.

Similar letters of reference refer to similar parts throughout the several views.

Referring to the drawings, the numeral 1, designates the supporting frame of my machine. This frame is preferably constructed of metal angle bars 2, and is substantially rectangular in form, although it may be made of any other form and of any other suitable material. To this frame I secure a conical shaped tank 3, in any suitable manner, and the smaller end of this tank is provided with a discharge spout 5, to which a valve or gate 6, is secured, which may be of any suitable type. Within the tank 3, I place a second conical tank 7, which is enough smaller than the tank 3 to leave an annular concentrates receiving chamber between them. The inner tank 7 is provided with a discharge spout 8, at its lower end, which extends through the tank 3, and a suitable valve or gate 9 is placed on the end of the spout 8. This tank 7 is secured by brackets 10 to the outer tank 3. A supporting bar 11 is secured across the tank 7, intermediate of its upper and lower ends, which is provided with a bearing 12, which supports the lower end of a short pipe 13, upon the upper end of which is screwed an elbow 14, in the upper end of which is screwed a short length of pipe 15, upon the end of which is screwed a reducer 16, having a plurality of openings 17 in its surface midway between its ends, the purpose of which will be explained hereinafter. In the upper end of this reducer is screwed the lower, plugged, end of a water supply pipe 18, which extends up above the top of the machine and connects with a supply of water, a valve 19 being arranged at a convenient point in the pipe beyond the top of the machine, for regulating or cutting off the supply of water. Around this water pipe I rotatably mount a feed tube 20, the upper portion of which is supported in a hub bearing 21, which rests upon the top of bars 22, which are attached to standards 23, supported upon the main frame, while the lower portion of this tube extends through a circular aperture in a ball bearing plate 24, which is secured upon bars 25, attached to the standards 23. A bevel gear 26 is mounted on this tube so as to rest upon the balls in the plate 24, and is driven by a bevel pinion 26$^A$ that is mounted on a shaft 27, that is journaled horizontally across the top of the machine in bearings 28, that are secured to the cross bars 22. This shaft 27 extends beyond the frame and is adapted to be driven by power, and is provided with a pulley 29 or other suitable power transmitter. The upper end of the feed tube 20 is provided with a reducer 30, upon the lower portion of which is secured the lower discharging end of a conical ore feed hopper 31, the upper portion of the reducer being within the hopper. A tube 32, which surrounds the upper portion of the water pipe, is screwed into the upper end of the reducer, and the body of the reducer between its threaded ends is provided with openings 33, which form a communication between the lower end of the hopper and the feed tube 20. A conical disk 34, which I call the feed plate, is secured to the lower end of the tube 20, and revolves with it, and its under side is formed with ore feeding flukes 35, which extend from it in proximity to the surface of a conical shaped circular plate 36, which I term the ore distributing plate, which is secured to the water supply pipe 18, and is a stationary plate.

To one of a plurality of depending arms 37, on the feed disk, I secure a small hopper 38, from the discharge end of which a spout 39 extends toward the water pipe 18, and is arranged to discharge into a conical hopper 40, from the lower end of which extends a cylindrical sample-receiving chamber 41, which surrounds the water pipe at its lower end, where it is screwed into the reducer 16, the opening 17 of which connects the chamber with an outlet pipe 15$^A$ extending from the elbow 14. A reservoir 42, surrounds the sample chamber, over the upper end of which a cover 43 is supported, but so as not to rest upon the top of the reservoir, and pipes 44 extend from the water pipe 18, through the hopper 40 and cover 43, and into the reservoir 42, and these pipes convey water from the supply pipe 18 to the reservoir 42, whence it overflows upon a circular copper plate or disk 45, which forms the bottom of the reservoir and sample-receiving chamber. This disk is slightly conical in form, and of slightly less diameter than the inner tank 7, the top of which is only a slight distance below the disk 45. Brackets 46, connected to the disk and to the said tank, serve to support the disk. In practice, the disk 45 is coated with quicksilver, whereby any particles of gold which may be in the ore discharging upon this disk, will be collected thereon, and thus saved.

The outlet or discharge pipe 15$^A$ extends at an oblique angle through and beyond both of the tanks 3 and 7, and discharges continuously, samples of the ore flowing through the machine, on the outside of the tanks, into a suitable receptacle. The water supply pipe 18, the sample chamber 41, and its discharge spout, the tanks 3 and 7, and the water reservoir 42, are stationary, and do not rotate, being affixed to and supported by the frame or the other members of the machine.

To the depending arms 37 of the revolving feed disk, I secure a circular depending band 47, which converges in the form of the inverted frustum of a cone, and to the lower edge of this band is secured a pair of circular converging screens, which are so arranged that a suitable space is left between them. The outer screen 48 is of fine mesh, and slightly shorter than the inner screen 49, which is of coarser mesh, the fineness and coarseness of the mesh of these screens being dependent upon the character of the ore.

The ore from the distributing plate 36, falls upon a circular deflecting flange 50, which depends from the upper edge of the conical hopper 40, and from this deflector it falls upon the coarse, inner screen 49, the oversize from which falls upon the plate 45, adjacent to the reservoir 42, while the smaller particles pass through this screen and onto the outer screen 48, where the finest product passes through and falls upon the plate 45, while the coarser particles discharge from the end of the screen and fall upon the plate 45, between the inner ring or circle formed by the coarsest particles of ore, and the outer ring formed by the finest particles of ore, the position of this intermediate product on the plate 45 being determined by the length of the screen 48.

Upon the upper edge of the band 47, is secured a plurality of outwardly projecting ears 51, and to the bars 25 are secured a pair of oppositely positioned depending spring arms 52, which extend into the path of the ears 51, and as the band, with the screens 48 and 49 revolves, the ears 51 will successively engage the said arms 52, which will yield under the pressure upon them, and as the ears escape the arms, the band, with the screens, will be shaken or vibrated in such a way as to dislodge the ore and cause it to pass through the screens, thus not only facilitating the action of the screens but preventing clogging of the same.

A plurality of blades 53, are secured in any suitable manner upon the water pipe 18, within the hopper 31, and as these blades are stationary, the ore in the hopper will be stirred up as the said hopper revolves, so that it will feed easily and quickly through the openings 33, of the reducer 30, into the feed pipe 20.

The outer tank 3, is provided on opposite sides with overflow outlets 54, having spouts 55, which lead to suitable settling tanks, and the lower edges of these openings are on a level with the peripheral edge of the disk 45, so that when the tank 3 is filled with water to the level of the outlets 54, the edge of the disk 45 will touch the surface of the water.

The operation of my improved ore feeding, screening, sampling, classifying, and separating machine is as follows: Ore crushed to a consistency of from about 20 to 80 mesh, is fed into the feed hopper 31, from which it flows into the feed tube 20, through the openings in the reducer 30, and falls onto the fixed distributing disk 36. This feed tube and its feed disk 34 rotate and the flukes on the under side of the feed disk move the ore outward on the surface of the stationary distributing disk, and it falls from the edge of the distributing disk onto the deflector 50, whence it falls upon the inner or coarse screen 49, the smaller particles passing through and onto the outer screen 48, while the oversize discharges from the lower edge of the inner screen, this material being the coarsest product. The next coarsest product is the oversize from the outer screen, and the finest product is that which passes through the outer screen. The ore falls in three concentric rings upon the plate or disk 45, the inner ring being the coarsest ore and the outer ring the finest ore, and over the disk a continuous sheet of water flows, being the overflow from the reservoir 42, which is supplied from the main pipe 18, through the small pipes 44. The water flows from the reservoir over the disk and on to the body of water in the tank 3, which is on a level with the said disk, and as the edge of the inner tank is slightly below this level it follows that this tank is also full of water. As the water flows off of the plate 45, it carries the ore with it, and the finest particles float out through the overflow openings 54, and through the spouts 55, to suitable settling tanks, not shown. The next coarser products or gangue matter, float beyond the edge of the inner tank, and settle in the outer tank, while the coarsest product passes over the edge of the plate 45, and settles immediately in the inner tank, and the material in the tanks may be discharged when necessary, through their respective valves. The floating slimes product of the ore that overflows out of the tank 3, on top of the water, is thus separated from the coarser product, and is led into suitable tanks, and settled or otherwise recovered, while the coarser mineral product of the tank 7, is led to concentrating tables. The gangue product if devoid of mineral particles, is run to waste, but if it should contain a concentrating material it is also run over concentrating tables. Most all of the rebellious sulfid and tellurium ores contain copper, zinc, lead, ruby silver, gold, bismuth, and other valuable metals, that when crushed and pulverized to form 20 to 40 mesh contain a considerable percentage of a fine slime flour-like product that carries rich values in these metals, and it is for the purpose of saving this floating slimes product that I have especially designed my combined ore feeding, screening, classifying, and separating machine, which possesses the additional advantage of enabling the operator to secure continuously, as the machine is doing its regular work, a sample of the ore that is passing into and through the machine. This sample is gathered by the revolving spout, which rotates under the ore falling from the distributing disk, and discharges it into the sample tube, from which it flows out through the spout 15ᴬ into a box, from which it can be assayed as often as desired to determine the value of the ore passing through the machine, and as this sample is taken automatically from every part of the downward stream of ore, it is a true index of the value of the ore.

Having described my invention, what I claim as new and desire to secure by Letters Patent, is:

1. In an ore feeder, classifier, and separator, the combination with a supporting frame, of a pair of inverted conical tanks positioned one within the other, with a space between them, a water supply pipe adjacent to said tanks, a water distributing disk above said inner tank, a conically arranged screen positioned to feed its oversize to the apex portion of said conical disk, and to allow its screened product to drop onto the water flowing over said disk from said water supply pipe, an ore feeding mechanism above said screen and water distributing disk.

2. In an ore dressing machine, the combination with a supporting frame, of a pair of conical tanks, one within the other, supported by said frame, a feed hopper above said tanks, a revoluble feed spout connected to the discharge end of said hopper, an ore distributing disk below said feed spout, an inverted conical shaped screen below said feed disk and spout, a water distributing disk below said screen arranged to receive both the oversize and the screened product from said screen, means including a water supply pipe for flowing a stream of water over said water distributing disk, and means for drawing the settled ore product from said tanks and the surface water and ore from said tanks.

3. In an ore dressing machine, the combination of a water supply pipe; a reservoir surrounding the lower end of the pipe, and adapted to be filled therefrom; a conical plate beneath the reservoir and adapted to receive the overflow from the reservoir; a conical screen above the plate; an ore distributer above the screen, and means for feeding ore to the distributer; a tank below the conical plate; a second tank surrounding said tank and of greater depth, having overflow opening on a level with the conical plate; and valves for emptying said tanks.

4. In an ore dressing machine, the combination with a water supply pipe, of a circular plate at the lower end of the pipe and concentric therewith; a circular reservoir upon said plate surrounding the pipe and adapted to be supplied therefrom, said plate being adapted to receive the overflow from the reservoir; a conical, revoluble screen above said plate; a circular ore distributer above the screen; a feed hopper and a tube connecting the hopper with the distributer; a conical tank surrounding the circular plate, having overflow openings on a line therewith; a conical tank with said first tank, the upper edge of which is below the water level of the first tank; a space being left between said tanks; and valves for emptying said tanks.

5. In an ore dressing machine, a vertically disposed water supply pipe closed at its lower end; a feed hopper surrounding the upper portion of said pipe; a feed tube extending from said hopper and surrounding the pipe; an ore distributer, comprising a conical plate secured to the water pipe below the lower end of the feed tube, and a conical plate on the end of the feed tube, and means for rotating said hopper, tube and upper conical plate; a conical ore and water receiving plate at the lower end of the water pipe; a circular reservoir above said plate surrounding the water pipe, and adapted to be supplied therefrom, and to overflow upon said plate; a conical screen surrounding the reservoir and arms connecting the screen with the revoluble member of the ore distributer; a hopper within the screen; a tube extending from said hopper to the bottom of the reservoir and surrounding the water pipe, and means for supporting the lower end of the pipe and for connecting said tube with an outlet; a sampling spout connected with the screen and adapted to catch ore from the distributer and discharge it in the hopper within the screen; a conical tank surrounding the ore and water receiving plate, having overflow outlets on a line with said plate; and an inner conical tank, the upper edge of which is below the water level of the outer tank.

6. In an ore dressing machine, the combination with a circular platform, a circular reservoir adapted to overflow upon the platform, and a water supply pipe connected with the reservoir; of a conical screen comprising inner and outer members of different meshes; an ore distributer above said screen, comprising upper and lower conical members; means for connecting the screen with the said upper member; a hopper; a feed tube connecting the hopper with the distributer and means for rotating the hopper, the tube, the upper member of the distributer, and the screen in unison; conical tanks below the circular platform, arranged one within the other, the outer tank having overflow outlets on a level with said platform, the top of the inner tank being below said level; and valves for emptying said tanks.

7. In an ore dressing machine, the combination of a conical platform; a circular reservoir adapted to overflow upon said platform; a conical tank surrounding the platform, having overflow outlets on a level with the platform; a conical tank adapted to be submerged within the outer tank, and of slightly greater diameter than the platform; a water supply pipe closed at its lower end and supported within the inner tank, and extending through and above the said reservoir; tubes connecting said pipe with the reservoir; a hopper surrounding the upper portion of the pipe; a feed pipe depending from the lower end of the hopper, and surrounding the water pipe, and means for rotating said feed pipe and hopper and ore distributer, comprising a fixed conical plate on the water pipe below the feed pipe, and a conical plate above and adjacent to said fixed plate, which is secured to the lower end of the feed pipe; a conical screen below the distributer, and connected with the rotatable member thereof, comprising inner and outer members of different mesh, and of different lengths.

8. In an ore dressing machine, the combination with an outer conical tank, having overflow outlets; a conical tank adapted to be submerged within said outer tank; a support in said inner tank; an upright pipe upon said support, having a branch extending out through said tanks; a reducer on the end of the upright pipe, having openings through its surface; a water supply pipe closed at its lower end, which is threaded in the upper end of the reducer; a tube surrounding the lower end of said pipe and the reducer; a conical copper platform surrounding said reducer, and supported upon the inner conical tank; a circular reservoir surrounding said tube and resting upon the platform, and pipes connecting the water supply pipe with the reservoir, whereby the same is filled and overflows upon the platform; a conical screen above the platform, comprising inner and outer members, of different lengths and mesh; an ore distributer above the screen, comprising a fixed and a rotatable conical member in operative relation; arms connecting the screen with the rotatable member; a feed hopper; a feed pipe connecting the hopper and rotatable member and surrounding the water supply pipe; a conical hopper in the screen connected with the tube surrounding the lower end of the water pipe; and means for rotating the feed hopper, the feed pipe, the upper member of the distributer, and the screen.

9. In an ore dressing machine, an upright water supply pipe, having its lower end closed; a tube surrounding the lower end of said pipe, and a support for the pipe, having an outlet communicating with the tube; a reservoir surrounding the tube; a conical, amalgamating platform beneath the tube and reservoir, and pipes connecting the reservoir and water supply pipe, the water from said reservoir being adapted to overflow upon the said platform; a rotatable conical screen above the reservoir; an ore distributer above the screen, comprising a fixed and a rotatable conical plate; a feed hopper surrounding the upper portion of the water supply pipe; a feed pipe connecting the feed hopper and ore distributer and surrounding the pipe; means for rotating said hopper, feed pipe, and upper member of the distributer; conical tanks arranged one within the other, below the amalgamating platform, the outer tank having overflow outlets on a level with the platform, while the top of the inner tank is below water level of the outer tank; and a spout connected with the screen and adapted to receive portions of the ore from the distributer, and discharge it into the tube surrounding the lower end of the water supply pipe.

10. In an ore dressing machine, the combination with a conical amalgamating platform; means for flowing water over the same from the center outward, and a circular ore distributer comprising a fixed, conical plate, and a rotatable conical plate, in operative relation thereto; and means for feeding ore to said distributer; of a rotatable, conical screen beneath the distributer and concentric with the axis of the same, comprising an inner and an outer screen arranged with an intervening space, the inner screen being or coarser mesh than the outer screen, while the outer screen is of less length than the inner screen; and tanks below said amalgamating platform, for receiving the product from said platform.

11. In an ore dressing machine, the combination of a pair of conical tanks arranged one within the other, the inner one being submerged; a circular amalgamating platform above said tanks of less diameter than the inner tank; and means for continuously overflowing said platform; a rotatable conical screen above said platform, comprising inner and outer members of different lengths and mesh; a circular ore distributer above the screen; and means for feeding ore to the distributer.

12. In an ore dressing machine, the combination with a circular amalgamating platform; a tubular receptacle in the center of said platform, and an outlet pipe from said receptacle; a reservoir surrounding the tubular receptacle, and means for supplying water to said reservoir to form a continuous overflow upon the platform; a rotatable conical screen above the platform; a circular ore distributer above the screen; means for feeding ore to the distributer; a spout connected with said receptacle for catching portions of the ore falling from the distributer, and having its discharge end over the tubular receptacle; and conical water tanks below the amalgamating platform, one within the other, the inner tank being of slightly greater diameter than the said platform, the outer tank having overflow outlets on a level with the platform, while the top of the inner tank is slightly below the water level of the outer tank.

13. In an ore feeding machine, the combination with a supporting frame, of a tube vertically mounted therein; a feed hopper at the upper end of the tube; a gear wheel on said tube, and a power driven pinion in mesh with the gear wheel; a water supply pipe extending through the hopper and tube and closed at its lower end; an ore distributer comprising two contiguous conical plates, one of which is secured to the lower end of the tube, and the other to the water supply pipe; a conical screen depending from the rotatable member of the distributer; ears projecting from the frame of said screen, and spring blades in the path of said ears, whereby the screen is vibrated during its rotation; a sample receptacle surrounding the lower end of the water supply pipe; a reservoir surrounding the sample receptacle, and pipes connecting the water supply pipe and reservoir, whereby the reservoir is caused to continuously overflow; a circular amalgamating platform beneath and concentric with the reservoir, which is adapted to receive the overflow from the reservoir and the ore from the screen; a spout connected with the receptacle for catching portions of the ore from the distributer, and having its discharge end over said sample receptacle, water tanks below the platform arranged one within the other, for receiving the product of the platform; and means which form a support for the lower end of the water supply pipe and an outlet for the sample receptacle.

14. In an ore dressing machine, the combination with a conical tank, having overflow outlets; a conical tank within the first tank, and adapted to be submerged; of a circular amalgamating plate supported on a level with the said overflow outlets, and of less diameter than the inner tank; means for continuously flowing a sheet of water over said plate from the center outward; a circular ore distributer concentric with said plate; a conical screen below said distributer which separates the ore falling upon the plate into three concentric rings of varying degrees of fineness; means for rotating the screen; and means for imparting vibrations to the screen during its rotation.

In testimony whereof I affix my signature in presence of two witnesses.

HOWARD G. KING.

Witnesses:
G. SARGENT ELLIOTT,
ADELLA M. FOWLE.